No. 611,730. Patented Oct. 4, 1898.
M. C. GRAY.
SOFT TREAD HORSESHOE.
(Application filed May 7, 1898.)
(No Model.)
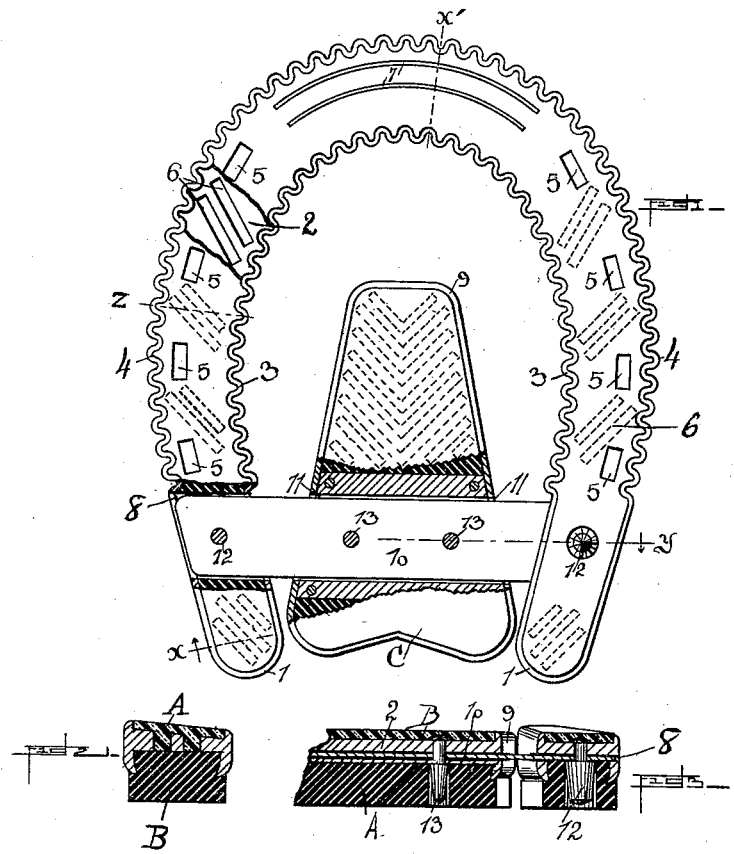
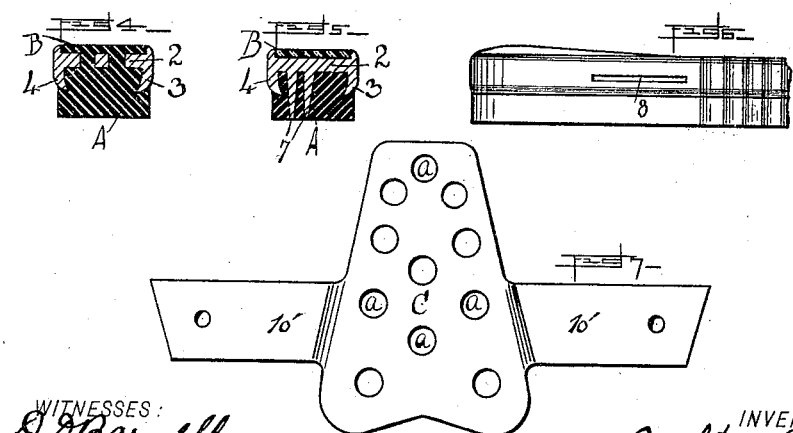
WITNESSES: INVENTOR
D. O. Barwell. Milton C. Gray
M. Marr. BY
ATTORNEY.

UNITED STATES PATENT OFFICE.

MILTON C. GRAY, OF OMAHA, NEBRASKA.

SOFT-TREAD HORSESHOE.

SPECIFICATION forming part of Letters Patent No. 611,730, dated October 4, 1898.

Application filed May 7, 1898. Serial No. 679,984. (No model.)

*To all whom it may concern:*

Be it known that I, MILTON C. GRAY, residing at Omaha, in the county of Douglas and State of Nebraska, have invented certain useful Improvements in Soft-Tread Horseshoes; and I do hereby declare that the following is a full, clear, and exact description of the invention, such as will enable others skilled in the art to which it appertains to make and use the same, reference being had to the accompanying drawings, which form a part of this specification.

This invention relates to a new and useful improvement in horseshoes.

The object of my invention is to provide a one-piece horseshoe comprising a base main plate or web in outline conforming to a horse's hoof and being provided with an encircling crimped border extending at right angles to the web or base-plate, so that the horseshoe in cross-section resembles the letter I. In conjunction with my one-piece horseshoe I use a frog-shield, which frog-shield is fixed to or forms part of a supporting-bar, which supporting-bar is secured to the horseshoe, so that when complete my invention embodies a one-piece horseshoe, a frog-shield, and a bar uniting said frog-shield to said horseshoe. The frog-shield preferably comprises a perforated sheet-metal plate, which is provided with a soft-tread and a non-conducting cushion above, which cushion is made of suitable material adapted to retain a certain amount of moisture, thus insuring the animal's hoof being kept in a healthy condition. The shield further supporting the frog aids in preventing the dropping of the sole, and by means of my improved horseshoe the hoof is supported around its full bearing-surface at the edge and centrally by means of the shield.

In the accompanying drawings, Figure 1 shows a bottom plan view of a one-piece horseshoe embodying my invention with parts broken away. Fig. 2 shows a sectional view on line $x$, looking in the direction of the arrow. Fig. 3 shows a sectional view with a portion broken on line $y$, looking in the direction of the arrow. Fig. 4 shows a sectional view on the line $z$, while Fig. 5 shows a sectional view on line $x'$. Fig. 6 shows a broken side view of my horseshoe, showing the slot adapted to receive the frog-shield-retaining bar, while Fig. 7 shows a top view of a modification of a frog-shield, wherein the shield and retaining-bar are in one piece.

My invention embodies a horseshoe embodying a base-plate or main supporting-web 2, which is provided with an inner and outer flange 3 and 4, extending in both directions, which flange is corrugated a certain distance, as is shown in Fig. 1. The rear portion 1, where the flanges surround the end of the shoe, is plain, as will be noticed in referring to Fig. 1.

Referring to Figs. 3, 4, and 5, it will be understood that the web 2 of the shoe is bordered by the flanges 3 and 4, so as to form in cross-section the letter I, though the flanges extending downward are somewhat longer than the flanges extending upward. At suitable points the shoe is provided with the openings 6 6, as is shown in Fig. 1, so as to make the shoe lighter, and these openings further make it possible to provide the lower tread A and the upper packing B of the same material, so that this filler or packing material can be all of one material and cast about the shoe, as will be understood in referring to Fig. 4.

Near the toe the shoe is provided with two extending webs 7 7, which act in the capacity of calks, so as to prevent too rapid wearing of the shoe at the point where most of the wear occurs. At suitable points the shoe is further provided with the usual nail-openings 5 5. At a suitable point, preferably below the web 2, the flanges are provided with the slots 8, as is shown in Figs. 3 and 6, so that the shield-retaining bar 10 may be inserted through these slots and so be retained in proper position by means of the insertible calks 12.

The shield C is of suitable size to properly fit within the horseshoe and in cross-section representing the letter I, being provided with the flange 9, completely surrounding the same and also extending above and below the shield proper, as is shown in Fig. 3, this shield also being provided with a slot 11 running through the same, through which the bar 10 passes, being held in position by means of the calks 13, the shield being provided with suitable perforations to make the same lighter and also so as to facilitate the casting upon this shield of a tread A and the cushion B, as is shown.

The shield C is intended to be fitted within the shoe and secured to the retaining-bar 10 by means of the calks 13. The shoe is secured by means of ordinary nails, as is usual in the art. In referring to Fig. 2 it will be noticed that the upper surface of the rear end of the shoe is inclined upwardly and inwardly. This is done so that the horse's hoof is automatically spread outward.

In Fig. 7 I have shown a modification of the shield C, in which the openings $a$ are provided to facilitate securing the tread and cushion, but in which the arms 10' are made an integral part of the shield proper in place of the single retaining-bar 10, the shield-arms being provided with holes through which the calks 12 pass, so that practically the shield and shoe form one part. From this it will be seen that I provide a natural sole-bearing horseshoe in which the heel portions are provided with inwardly-inclined surfaces to provide an automatic heel-spreader.

Having thus described my said invention, what I claim as new, and desire to secure by United States Letters Patent, is—

1. A one-piece horseshoe provided with upwardly and downwardly extending corrugated flanges surrounding the edges of said shoe and with perforations within said shoe, and a frog-shield connected with said shoe by virtue of suitable arms and provided with suitable perforations, as and for the purpose set forth.

2. In a one-piece horseshoe having upwardly and downwardly extending flanges surrounding the edges of said shoe, said flanges being corrugated, the combination with such shoe of a frog-shield connected with said shoe by virtue of suitable arms, as and for the purpose set forth.

3. In a one-piece horseshoe provided with upwardly and downwardly extending flanges surrounding the edges of said shoe, a bar secured to said horseshoe, near to and extending from one heel portion to the other, and a shield secured to said bar, as and for the purpose set forth.

4. The combination with a horseshoe provided with upwardly and downwardly extending corrugated flanges surrounding the edges of said horseshoe, said horseshoe further being provided with perforations, a frog-shield provided with suitable perforations, and extending arms secured to said horseshoe, the heels of said horseshoe inclining upwardly and inwardly, as and for the purpose set forth.

5. A one-piece horseshoe provided with perforations and having upwardly and downwardly extending corrugated flanges, and a packing or filler within said corrugated borders, as and for the purpose set forth.

6. The combination with a horseshoe provided with perforations and having upwardly and downwardly extending corrugated flanges forming a retaining-border, in combination with a frog-shield provided with arms secured to said horseshoe, as and for the purpose set forth.

7. A frog-shield provided with perforations and a border extending upwardly and downwardly from the edges of said frog-shield, and arms extending from said shield, and a packing-filler secured to form part of said shield, as and for the purpose set forth.

8. As a new article of manufacture, a perforated frog-shield, retaining-arms extending from said shield, and a packing-filler secured to form part of said shield, as and for the purpose set forth.

In testimony whereof I affix my signature in presence of two witnesses.

MILTON C. GRAY.

Witnesses:
G. W. SUES,
MAMIE MARR.